(12) United States Patent
Tackett et al.

(10) Patent No.: US 6,520,600 B1
(45) Date of Patent: Feb. 18, 2003

(54) CONTROL VALVE WITH SINGLE PIECE SLEEVE FOR A HYDRAULIC CONTROL UNIT OF VEHICULAR BRAKE SYSTEMS

(75) Inventors: Wendell D. Tackett, Ann Arbor, MI (US); Gary R. Knight, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/658,536

(22) Filed: Sep. 9, 2000

(51) Int. Cl.[7] .................................................. B60T 8/36
(52) U.S. Cl. ...................................................... 303/119.2
(58) Field of Search ........................... 303/119.1, 119.2, 303/119.3

(56) References Cited

U.S. PATENT DOCUMENTS 2,853,659 A    9/1958  Herion
3,829,060 A  * 8/1974  von Lewis .................... 251/86
4,785,848 A  * 11/1988 Leiber .................... 137/596.17
5,203,617 A  * 4/1993  Volz et al. ................ 303/119.2
5,221,125 A  * 6/1993  Okochi et al. ........... 303/119.2
5,472,266 A  * 12/1995 Volz et al. ................ 303/119.1

FOREIGN PATENT DOCUMENTS

DE    197 00 979 A1     7/1998
EP    0 951 412 B1     10/1999
EP    0997363 A2   *   5/2000

* cited by examiner

Primary Examiner—Jack Lavinder
Assistant Examiner—Robert A. Siconolfi
(74) Attorney, Agent, or Firm—MacMillan, Sobanski & Todd, LLC

(57) ABSTRACT

A hydraulic control unit of a vehicular brake system includes a housing. A bore is formed in the housing. A valve seat is received in the bore. A sleeve is mounted on the valve seat. The sleeve includes an annular groove for receiving material from the housing to retain the sleeve on the housing. An armature core is slidably received in the sleeve.

16 Claims, 4 Drawing Sheets

CONTROL VALVE WITH SINGLE PIECE SLEEVE FOR A HYDRAULIC CONTROL UNIT OF VEHICULAR BRAKE SYSTEMS

BACKGROUND OF THE INVENTION

This invention relates in general to vehicular brake systems, and in particular is concerned with control valves mounted in a hydraulic control unit of an electronically controlled brake system.

Electronically-controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly slides the armature from the biased open or closed position to a closed or open position, respectively.

Control valves mounted in a HCU are actuated by an electronic control module to provide desired braking functions such as anti-lock braking, traction control, and vehicle stability control.

SUMMARY OF THE INVENTION

This invention relates to control valves mounted in a hydraulic control unit of a vehicular brake system. Each control valve includes a single piece sleeve that receives a reciprocating armature. The sleeve includes a reduced thickness section that produces a desirable effect when a control valve is energized. The sleeve also includes a bendable portion that is crimped onto a valve seat to improve assembly of the control valve.

In a preferred embodiment, a hydraulic control unit of a vehicular brake system includes a housing. A bore is formed in the housing. A valve seat is received in the bore. A sleeve is mounted on the valve seat. The sleeve includes an annular groove for receiving material from the housing to retain the sleeve on the housing. An armature core is slidably received in the sleeve.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
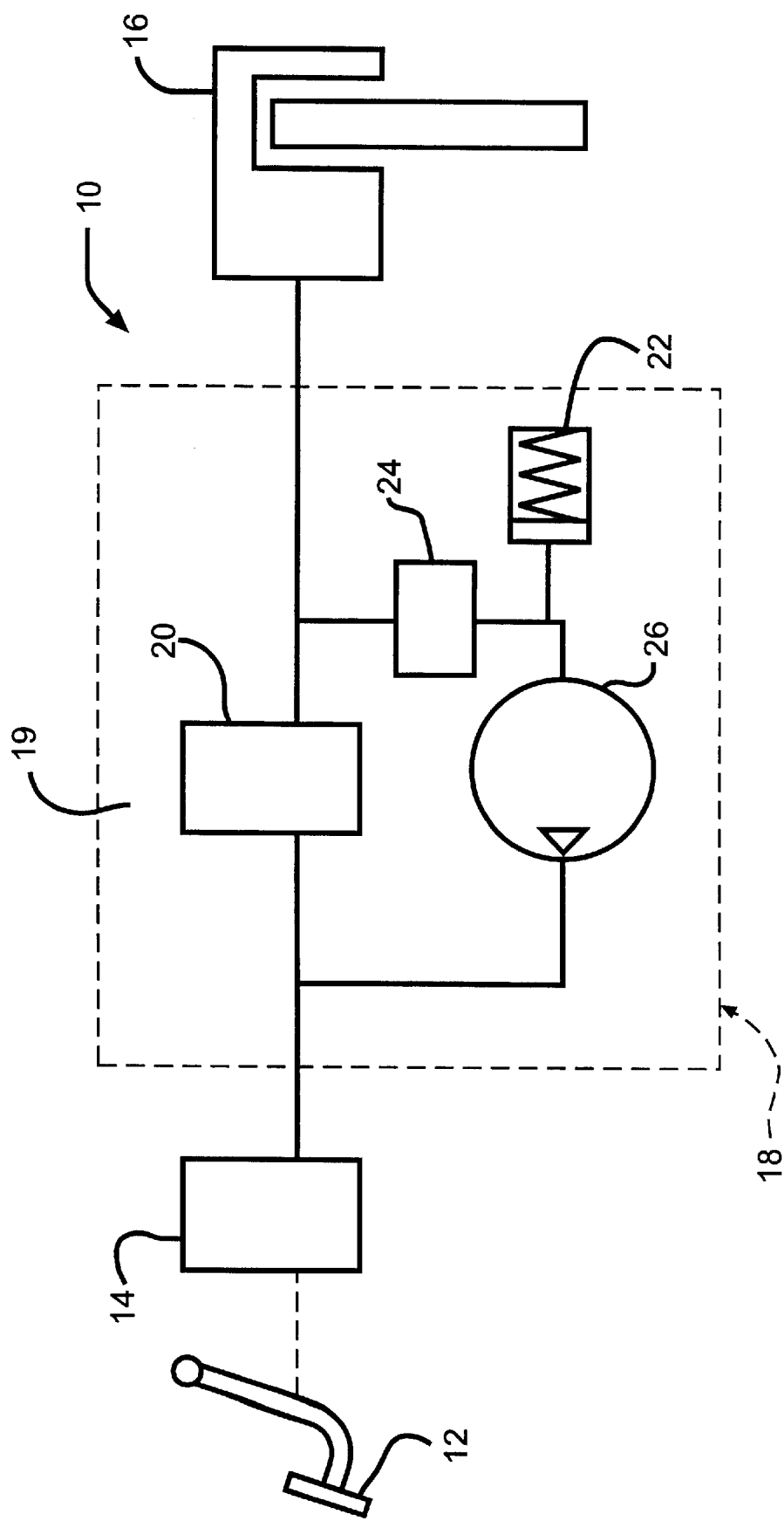
FIG. 1 is a schematic diagram of a vehicular braking system according to the present invention illustrating a hydraulic control unit having a normally open control valve, a normally closed control valve, an accumulator, and a pump.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles, including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator, restricted orifices, and check valves (none of which are illustrated), depending upon the system design. Control valve 20 is preferably formed as a solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
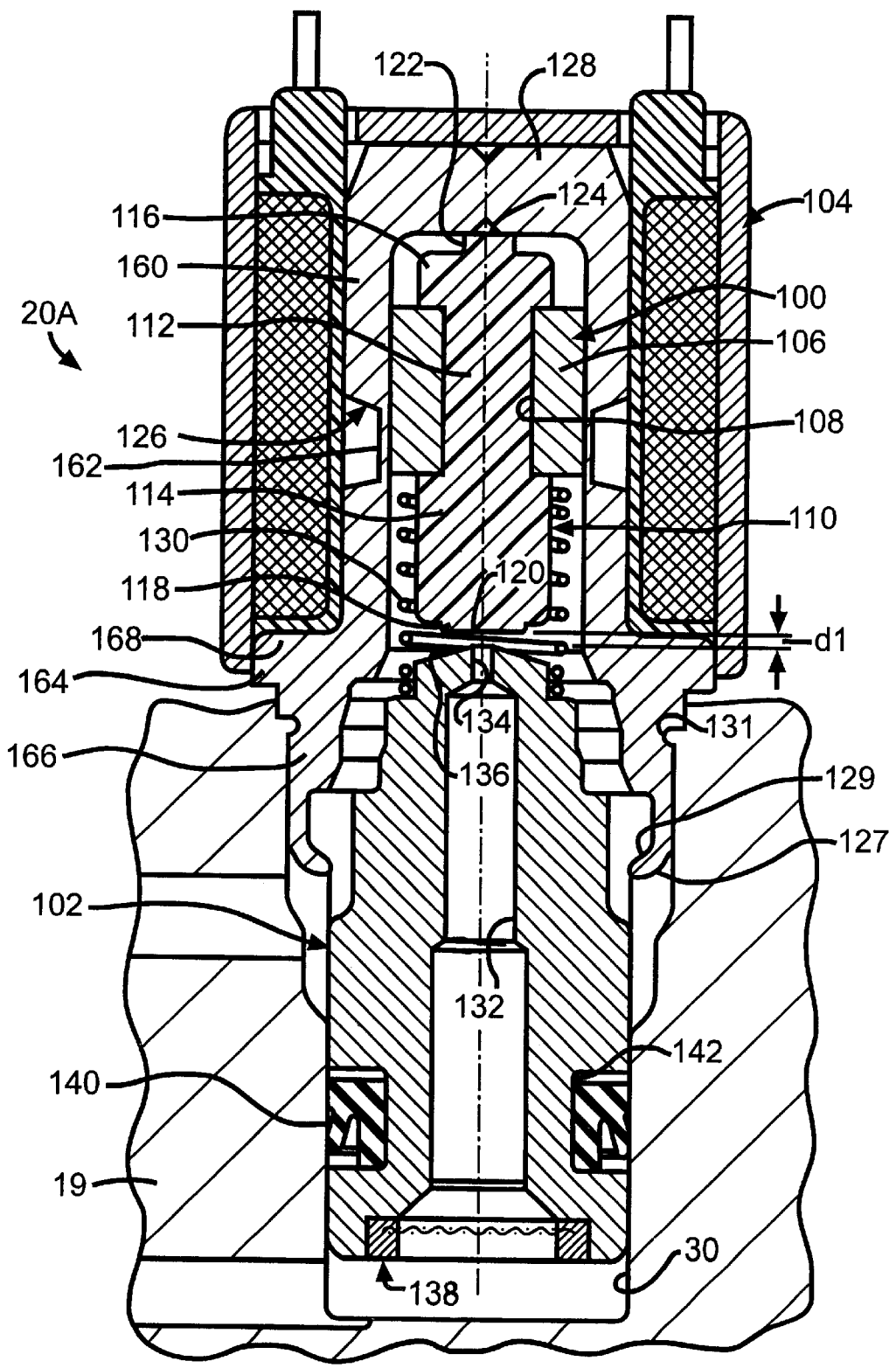
FIG. 2 is a sectional view through the hydraulic control unit of FIG. 1 illustrating a first embodiment of the normally open control valve according to this invention.

A sectional view of a preferred embodiment of the isolation valve 20 is indicated generally at 20A in FIG. 2. The isolation valve 20A is received in a bore 30 formed in the housing 19. As described below in detail, the isolation valve 20A includes an armature 100 biased away from a valve seat 102 when the valve 20A is not energized. When a coil assembly 104 is energized to produce an electromagnetic field, the armature 100 is pulled toward the valve seat 102 to close fluid flow through the valve 20A.

The armature 100 is formed as a subassembly and then assembled with the remainder of the valve 20A. The armature 100 includes an armature core 106 formed as a hollow cylinder from a ferromagnetic material. Preferably, each end of the armature core 106 is a planar surface. The armature core 106 includes a longitudinal (preferably axial) passage 108. The longitudinal passage 108 can be formed as a bore. Preferably, the longitudinal passage 108 is formed with a constant diameter.

The armature 100 also includes an armature body 110. Preferably, the armature body 110 is formed from a molded material such as polyphenylene sulfide (PPS) or polypthalamide (PPA). The armature core 106 can be placed in a mold. Then the desired material can be injected into the mold to form the armature body 110. The armature body 110 includes a central section 112 that fills the longitudinal passage 108 of the armature core 106. A first end section 114 and a second end section 116 are formed at opposite ends of the central section 112. Each of the first and second end sections 114 and 116 extend beyond an end surface of the armature core 106 a predetermined distance. Each of the first and second end sections 114 and 116 has an outer diameter less than an outer diameter of the armature core 106. The outer diameters of the first and second end sections 114 and 116 are greater than an outer diameter of the central section 112. The first end section 114 preferably terminates in a projecting stub 118. The stub 118 preferably terminates in a planar end surface 120. The second end section 114 preferably terminates in a projecting stub 122. The stub 122 preferably terminates in a planar end surface 124. This formation and structure can be described as an armature core 106 having an overmolded armature body 110.

The armature 100 is slidably received in a sleeve or flux tube 126 having a closed end 128. A spring 130 biases the armature 100 away from the valve seat 102. An annular portion 127 adjacent an open end of the sleeve 126 is crimped onto an annular flange 129 formed on the valve seat 102. The combined sleeve 126 and valve seat 102 containing the armature 100 is retained in the bore 30 by any desired means including material of the housing 19 forced into a groove 131 formed in the outer surface of the sleeve 126.

The valve seat 102 includes a longitudinal fluid passage 132 that terminates in a reduced diameter opening 134. A seat 136 having an angle of approximately four degrees (as measured from a plane tangent to a terminus of the seat 136 to the downwardly sloping surface surrounding the terminus) is formed on an outer surface of the valve seat 102. The planar end surface 120 of stub 118 acts as a valve sealing element and engages the seat 136 when the armature 100 moves downwardly. When the stub 118 engages the seat 136, flow through fluid passage 132 and opening 134 is blocked. When the coil assembly 104 is not energized, the planar end surface 120 is spaced a distance d1 from the seat 136. At this position, the planar end surface 124 engages an inner surface of the closed end 128.

A filter assembly 138 is provided adjacent an inlet of the fluid passage 132. A lip seal 140 is provided in a groove 142 formed in an outer surface of the valve seat 102.

The armature 100 provides a responsive, economical element that reciprocates in the sleeve 126 during operation of the valve 20A to provide desired braking responses in the system 10.

Figure 3:
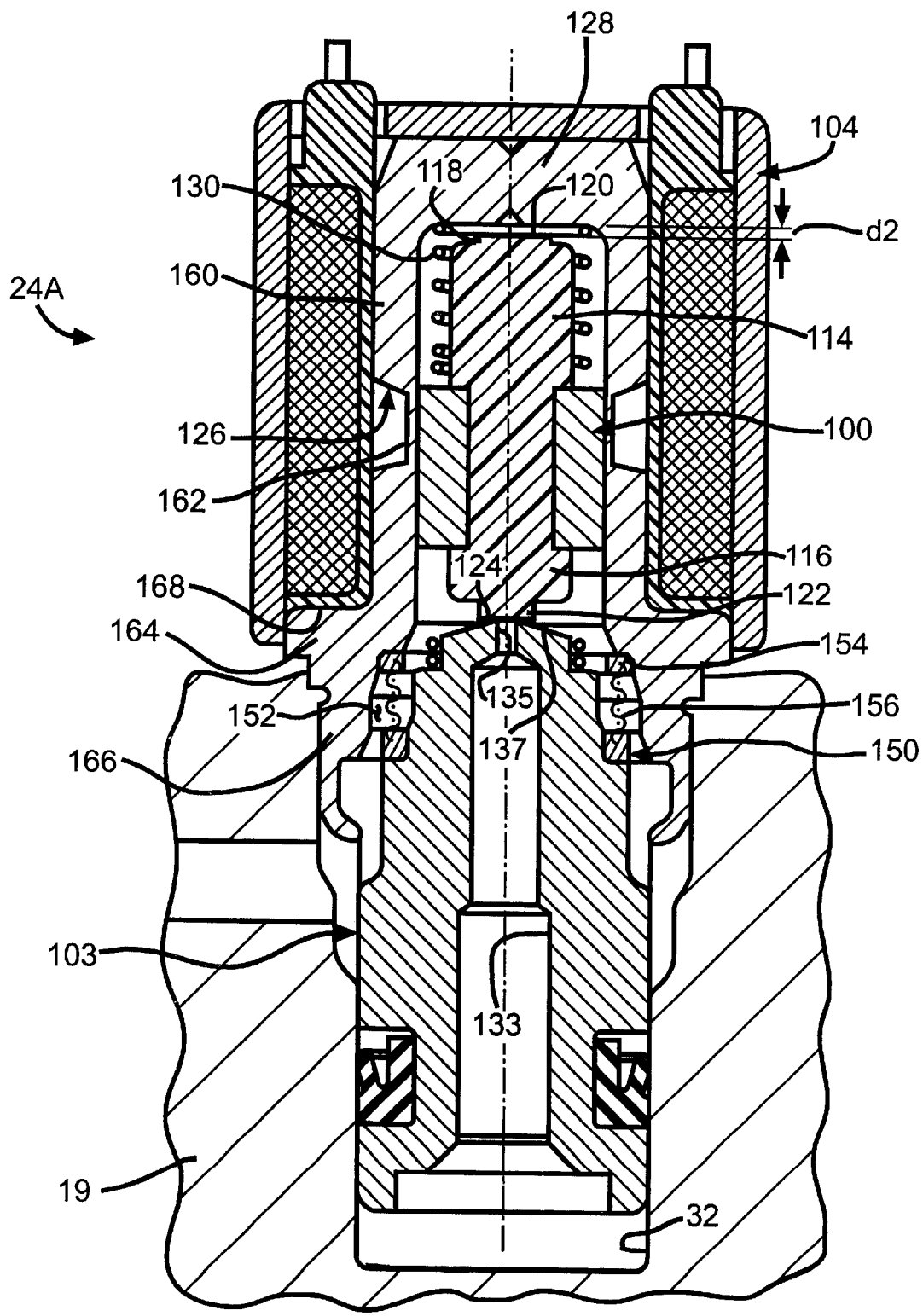
FIG. 3 is a sectional view through the hydraulic control unit of FIG. 1 illustrating a first embodiment of the normally closed control valve according to this invention.

A sectional view of a preferred embodiment of the dump valve 24 is indicated generally at 24A in FIG. 3. The dump valve 24A is received in a bore 32 formed in the housing 19. Preferably, the dump valve 24A includes many components identical to the isolation valve 20 of FIG. 2, including an armature 100, a coil assembly 104, a sleeve 126, and a spring 130. When the coil assembly 104 is not energized, the armature 100 is urged into contact with a valve seat 103 by the spring 130 to block fluid flow through the dump valve 24A. When the coil assembly 104 is energized, the armature 100 is urged toward a closed end 128 of the sleeve to permit fluid flow through the dump valve 24A.

As stated above, the armature 100 in dump valve 24A is preferably identical to armature 100 in isolation valve 20A of FIG. 2. Preferably, the armature 100 in dump valve 24A is inverted (rotated 180 degrees) when compared to the orientation of armature 100 in isolation valve 20A.

Armature 100 in dump valve 24A includes an armature core 106 and an overmolded armature body 110. A planar end surface 124 of stub 122 of the second end section 116 is engaged with a seat 137 formed on the valve seat 103 by a spring 130. When the coil assembly 104 is energized, the armature 100 is pulled away from the valve seat 102 so that fluid can flow through a fluid passage 132 and a reduced diameter opening 134 in the valve seat 102. When the coil assembly 104 is not energized, planar end surface 120 is spaced a predetermined distance d2 from an inner surface of the closed end 128.

An internal band filter 150 is placed between the sleeve 126 and the valve seat 103. Preferably, the band filter 150 is received in a pocket 152 formed between the sleeve 126 and the valve seat 103. The band filter 150 includes a ring 154 and a filter material 156. The band filter 152 is less prone to damage during assembly and installation of the valve 24A after the sleeve 126 has been crimped onto the valve seat 103.

As stated above, the sleeve 126 used in control valve 20A is preferably identical to the sleeve 126 used in control valve 24A. The sleeve 126 is formed from a ferromagnetic material. The sleeve 126 includes a hollow, cylindrical wall or tube portion 160 extending from the closed end 128. The thickness of the wall 160 is preferably constant, except for a reduced thickness section 162. Preferably, the reduced thickness portion 162 is formed in the wall 160 near its midpoint. Furthermore, the reduced thickness portion 162 is formed in the wall 160 adjacent the position of the armature core 106. An annular flange 164 is formed at the termination of the wall 160 opposite the closed end 128. An open, annular skirt 166 extends from the flange 164 opposite the wall and terminates in the annular portion 127. The groove 131 is formed in an outer surface of the skirt 166. Preferably, the sleeve 126 is formed as a single piece.

When assembled, a surface 168 of the flange 164 receives the coil assembly 104. In other words, a step 168 is formed on the sleeve 126 for receiving the coil assembly 104. The annular portion 127 is a bendable portion that is crimped to retain the sleeve 126 on the valve seat 102. As the sleeve/valve seat subassembly is inserted in a bore 30 or 32, material from the housing 19 is forced into the groove 131 to retain the sleeve/valve seat subassembly on the housing 19.

When the coil assembly 104 is energized, an electromagnetic field is formed about a coil that attracts the armature 100 in a well-known manner. A small amount of magnetic leakage passes through the reduced thickness portion 162. Pole sections are formed on opposite sides of the reduce thickness portion 162 as the armature 100 reciprocates in the sleeve 126. The single piece sleeve 126, formed as a machined part, does not require welding.

Figure 4:
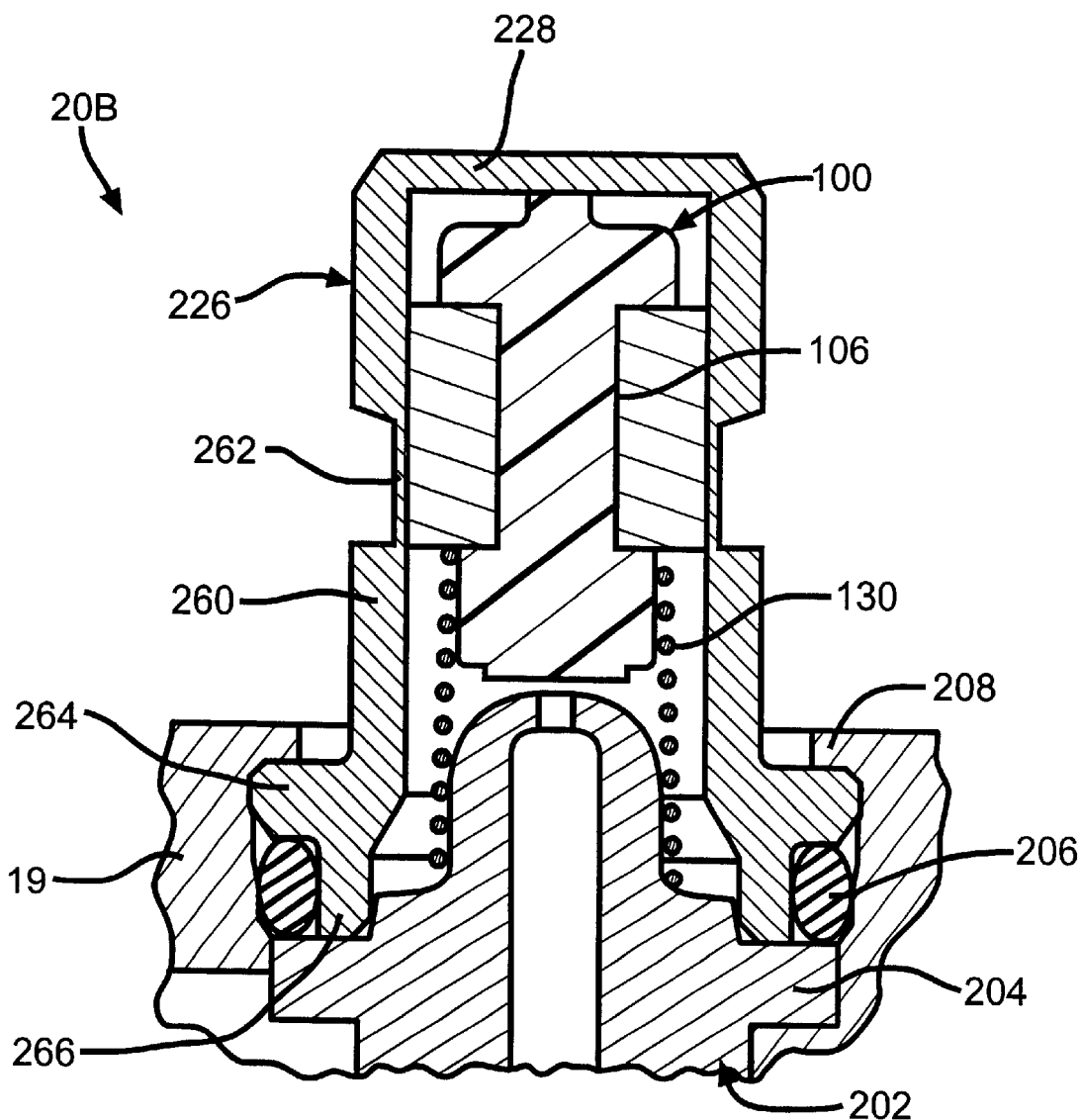
FIG. 4 is a sectional view of a second embodiment of a sleeve in a partially illustrated normally open control valve.

A second embodiment of a single piece sleeve is indicated generally at 226 in FIG. 4. The sleeve 226 can be used in control valves similar to valves 20A and 24A. The sleeve 226 is formed from a ferromagnetic material. The sleeve 226 includes a hollow, cylindrical wall or tube portion 260 extending from a closed end 228. The thickness of the wall 260 is preferably constant, except for a reduced thickness section 262. Preferably, the reduced thickness portion 262 is formed in the wall 260 near its midpoint. Furthermore, the reduced thickness portion 262 is formed in the wall 260 adjacent the position of the armature core 106. An annular flange 264 is formed at the termination of the wall 260 opposite the closed end 228. An open, annular skirt 266 extends from the flange 264 opposite the wall 260. Preferably, the sleeve 226 is formed as a single piece.

When assembled in a normally open control valve 20B, an armature 100 is slidably received in the wall 260. A lower surface of the skirt 266 rests on an upper surface of a flange 204 of a valve seat 202. A seal 206 can be provided between flange 264 and flange 204. A lip 208 is formed from the housing 19 to retain the sleeve 226 and valve seat 202 on the housing 19.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit comprising:
    a valve seat;
    a single piece sleeve made of ferromagnetic material mounted on the valve seat, the sleeve including a closed end, a continuous hollow cylindrical wall extending from the closed end to a termination of the wall, the cylindrical wall containing a circumferentially extending reduced thickness portion an annular flange formed at the termination of the wall, an annular skirt extending from the flange opposite the wall, and a bendable annular portion formed at a termination of the skirt, the annular skirt being disposed about the valve seat, the bendable annular portion of the skirt of the sleeve being crimped onto the valve seat to retain the sleeve on the valve seat; and
    an armature core slidably received within the hollow cylindrical wall of the sleeve.

2. The control valve defined in claim 1 including an annular groove formed in an outer surface of the annular skirt for receiving material from a housing to retain the sleeve on the housing.

3. The hydraulic control unit defined in claim 1 wherein the reduced thickness portion is formed near a midpoint of the wall.

4. The control valve of claim 1 wherein the armature core is formed from a molded material.

5. The control valve of claim 4 wherein the molded material is one of polyphenylene sulfide and polypthalamide.

6. The control valve of claim 5 wherein the armature core has a circumferentially extending band of ferromagnetic material mounted thereon.

7. A hydraulic control unit comprising:
    a housing;
    a bore formed in the housing;
    a valve seat received in the bore, the valve seat having an engagement surface, the valve seat defining a passage through the valve seat, the passage forming an opening in the engagement surface of the valve seat such that the engagement surface extends about the opening of the passage through the valve;
    a sleeve formed of a ferromagnetic material mounted on the valve seat and extending partially into the housing, an outer surface of the sleeve including two circumferentially extending and spaced-apart shoulders defining, in combination with a wall of the sleeve, a radially inwardly extending annular groove therebetween; and
    an armature core slidably received in the sleeve, the armature core having an end surface disposed to contact the engagement surface about said opening to block said opening when the valve is closed, the end surface of the armature core being spaced apart from the engagement surface of the seat when the valve is open.

8. The hydraulic control unit defined in claim 7 wherein the armature core includes a body formed of a moldable material and an armature core formed of a ferromagnetic material mounted on the body.

9. A control valve for controlling fluid flow in a hydraulic control unit comprising:
    a valve seat;
    a single piece sleeve mounted on the valve seat, the sleeve including a closed end, a hollow cylindrical wall extending continuously from the closed end to a termination of the wall, the cylindrical wall containing a circumferentially extending reduced thickness portion an annular flange formed at the termination of the wall, an annular skirt extending from the flange opposite the wall, and a bendable annular portion formed at a termination of the skirt, the annular skirt being disposed about the valve seat, the bendable annular portion of the skirt of the sleeve being crimped onto the valve seat to retain the sleeve on the valve seat;
    an armature core slidably received within the hollow cylindrical wall of the sleeve; and
    an annular groove formed in an outer surface of the annular skirt for receiving material from a housing to retain the sleeve on the housing.

10. The control valve defined in claim 9 wherein the sleeve is made of a ferromagnetic material.

11. A hydraulic control unit comprising:

a housing;

a bore formed in the housing;

a valve seat received in the bore, the valve seat having an engagement surface, the valve seat defining a passage through the valve seat, the passage forming an opening in the engagement surface of the valve seat such that the engagement surface extends about the opening of the passage through the valve;

a single-piece sleeve mounted on the valve seat and extending partially into the housing, the sleeve having an open end positioned about the valve seat and a closed end, with a tubular wall extending between the open end and the closed end, the wall having a first thickness next to said closed end, the sleeve including two circumferentially extending and spaced-apart shoulders defining a radially inwardly extending annular groove therebetween, the wall having a second thickness next to said open end, and the wall having a third non-zero thickness which is less than the first thickness and less than the second thickness at a location between the closed end and the open end of the sleeve; and an armature core slidably received in the sleeve, the armature core having an end surface disposed to contact the engagement surface about said opening to block said opening when the valve is closed, the end surface of the armature core being spaced apart from the engagement surface of the seat when the valve is open.

12. The hydraulic control unit defined in claim 11 wherein the sleeve is made of a ferromagnetic material.

13. The hydraulic control unit defined in claim 12 wherein the sleeve has an open end mounted on the valve seat and a closed end opposite the open end and further defining a second radially inwardly extending annular groove in the sleeve receiving material from the housing to retain the sleeve in the housing.

14. The hydraulic control unit defined in claim 13 wherein the armature core is formed from a molded material.

15. The hydraulic control unit defined in claim 14 wherein the molded material is one of polyphenylene sulfide and polypthalamide.

16. The hydraulic control unit defined in claim 15 wherein the armature core has a circumferentially extending band of ferromagnetic material mounted thereon.

* * * * *